United States Patent [19]

Ali et al.

[11] Patent Number: 4,820,760
[45] Date of Patent: Apr. 11, 1989

[54] NON PLATEOUT MOLDING COMPOSITION

[75] Inventors: Mir L. Ali, Bryan, Ohio; John F. Bateman, Lawrenceville, Calif.; Ming Man, Stow, Ohio

[73] Assignee: Ferro Corporation, Cleveland, Ohio

[21] Appl. No.: 55,421

[22] Filed: May 28, 1987

[51] Int. Cl.$^4$ ............................................. C08K 3/30
[52] U.S. Cl. ................................... 524/423; 523/205; 524/427; 524/432; 524/433
[58] Field of Search ................ 523/205; 524/423, 427, 524/432, 433

[56] References Cited

U.S. PATENT DOCUMENTS

| | | |
|---|---|---|
| 2,938,873 | 5/1960 | Kazenas . |
| 3,303,168 | 2/1967 | Kazenas . |
| 3,454,676 | 7/1969 | Busse . |
| 3,462,388 | 8/1969 | Horiguchi . |
| 3,592,777 | 7/1971 | Bayer . |
| 3,915,884 | 10/1975 | Kazenas . |
| 3,922,232 | 11/1975 | Schein ................................. 528/291 |
| 4,223,113 | 9/1980 | Bier et al. . |
| 4,238,384 | 12/1980 | Blumberg et al. . |
| 4,331,584 | 5/1982 | Nishikuri et al. . |
| 4,600,736 | 7/1986 | Needham ............................ 524/140 |
| 4,626,565 | 12/1986 | Kawai et al. . |

Primary Examiner—Joseph L. Schofer
Assistant Examiner—Peter D. Mulcahy
Attorney, Agent, or Firm—D. Peter Hochberg; Mark M. Kusner; Louis J. Weisz

[57] ABSTRACT

A novel molding composition is described which prevents plateout of pigment on the surface of a mold or shaping apparatus during the molding or shaping operation. The composition has improved thermal and oxidation stability as well as increased compatibility of the components of the composition. The composition comprises a thermoplastic resin, a fluorescent pigment, a metal salt or complex, polymer or oligomer reagent containing a reactive functionality and other conventional additives. The composition is useful in preparing such molded articles as films, bottles, closures, furniture and toys.

27 Claims, No Drawings

NON PLATEOUT MOLDING COMPOSITION

BACKGROUND OF THE INVENTION

1. Field of the Invention

This invention relates generally to a molding composition for inhibiting plateout of pigment on the surface of a mold or shaping apparatus during the molding or shaping operation. The composition also exhibits high compatibility of its components and improved thermal and oxidation stability. The molding composition of the invention comprises a thermoplastic resin, a reagent containing a reactive functionality, a fluorescent pigment and a metal salt or complex.

2. State of the Art

The pigmenting of thermoplastic resins, which are used to prepare molded articles by various molding and shaping processes, is well known. However, there have been numerous problems associated with preparing such molded articles from pigmented thermoplastics. For example, pigments are generally chemical compounds of radically distinct structure and chemistry from that of the thermoplastic resin to which the pigment is added. Therefore, the pigment is often times incompatible with the thermoplastic resin and this, in turn, creates problems of non-uniform dispersability within the thermoplastic resin molding composition as well as resulting in the pigment rising to the surface of the thermoplastic resin during the molding or shaping process. If the pigment does rise to the surface, it may adhere to the wall of the mold during the formation of the particular article. This phenomenon is referred to as "plateout". If this occurs, the resultant molded article will not have the desired uniformity and pigmentation. Also, with continuous use of the mold, the pigment will build up on the surface of the mold which, in turn, requires down-time of the molding apparatus in order to clean the mold surface.

Many of the problems associated with pigmenting thermoplastic resins for use in the preparation of molded articles have been satisfactorily resolved. For example, In U.S. Pat. No. 3,462,388 fluorescent compound bonded polymers, which can be molded or spun into filaments, are disclosed. It is disclosed in the patent that the fluorescent compounds are chemically bonded to the polymer to produce the desired properties.

U.S. Pat. No. 3,592,777 discloses a polymer blend that exhibits fluorescence when subjected to a selected activation energy. The polymers are prepared from an aliphatic or aromatic substituted aliphatic diketone and an aliphatic diamine which results in a linear non-cross-conjugated polymer.

U.S. Pat. No. 4,331,584 discloses various styryl compounds for coloring of synthetic resins. It is disclosed that these pigments have improved fastness to sublimation and increase pH sensitivity.

In U.S. Pat. No. 4,238,384, a method for incorporating additives in polymer materials is disclosed. The additives include stabilizers, anti-oxidants and antistatic agents. An optical brightener is incorporated in the thermoplastic polymer, and subjected to radiation to determine the degree of uniformity of the distribution of the additive-brightener blend.

U.S. Pat. No. 4,626,565 discloses a process for the preparation of polypropylene-based resin compositions. The composition is suitable for use in the preparation of such molded articles as automobile bumpers, fenders, body side members and the like. The polymers exhibit excellent low temperature impact resistance, high molding fluidity, good paintability and high stiffness.

U.S. Pat. No. 3,545,676 discloses blends of ionomer resins and elastomer. These blends give molded articles having both resilience and toughness.

U.S. Pat. No. 4,223,113 discloses polyester molding compositions which crystallize rapidly and thus allow lower mold temperatures along with shorter injection cycles.

U.S. Pat. No. 3,915,884 discloses various modified polyamides which are useful matrix materials for incorporating dyes, particularly fluorescent dyes. The dye incorporated into the modified polyamide forms a pigment having high heat stability.

U.S. Pat. No. 2,938,873 discloses various fluorescent pigments useful for pigmenting thermoplastic resins. The pigments exhibit improved light fastness and color brightness.

U.S. Pat. No. 3,303,168 discloses thermoplastic resins and molded articles thereof which are pigmented with fluorescent pigments.

None of the above-discussed patents disclose techniques relating to or solutions for the plateout problem. Furthermore, none of these patents disclose the unique composition of the present invention

SUMMARY OF THE INVENTION

In accordance with the present invention, a novel molding composition has been developed that inhibits plateout of pigment on the surface of a mold or shaping apparatus during the molding or shaping operation. Components of the composition exhibit high compatibility and also improved thermal and oxidation stability.

Further, in accordance with the invention, pigmented fluorescent molded articles having high impact strength are provided.

Still further in accordance with the invention, a method for inhibiting plateout of pigment on the surface of a mold or polymer shaping apparatus is provided.

Still further, in accordance with the invention, a polymer molding composition that effectively inhibits plateout has been discovered which is useful in a variety of different molding and shaping processes with different thermoplastic resins.

Still further in accordance with the invention, a polymer molding composition in a color concentrate form for effectively inhibiting plateout is provided. The color concentrate form of the molding composition is blended with the desired thermoplastic resin to prepare shaped articles.

Still further in accordance with the invention, a novel non-plateout molding composition is provided that exhibits improved thermal and oxidation stability as well as improved compatability of its components and comprises:

(A) at least one thermoplastic resin;

(B) at least one fluorescent pigment; and, (C) at least one polymer or oligomer reagent containing a reactive functionality selected from the group consisting essentially of carboxy and the polyvalent metal salts thereof, hydroxy, epoxy, amino or combinations thereof.

Still further in accordance with the invention, a novel non-plateout molding composition is provided that exhibits improved thermal and oxidation stability as well as improved compatibility of its components and comprises:

(A) at least one thermoplastic resin;

(B) at least one fluorescent pigment;

(C) at least one metal salt or complex selected from the group consisting of metal sulfates, carbonates, silicates, oxides, chromates and mixtures thereof; and, (D) at least one polymer or oligomer reagent containing a reactive functionality selected from the group consisting essentially of carboxy and the polyvalent metal salts thereof, hydroxy, epoxy, amino or combinations thereof.

These and other aspects of the invention will become clear to those skilled in the art upon the reading and understanding of the specification.

DETAILED DESCRIPTION OF THE PREFERRED EMBODIMENTS

The novel combination of components of the molding composition of the present invention is highly effective for inhibiting the phenomenon of plateout on the surface of the mold or shaping apparatus for forming shaped articles. As discussed above, plateout phenomenon occurs during the molding or shaping process of pigmented thermoplastic resins and results from the pigment rising to the surface of the resin and adhering to the surface of the mold or shaping apparatus. Build up of pigment on the surface or wall of the mold or shaping apparatus (e.g., rollers of a sheet extruder) creates numerous problems which include defects in the molded or shaped articles as well as the requirement for down time of the particular apparatus to clean the particular surface and, in turn, obviously affecting the economics for preparing the particular molded or shaped articles. The molding compositions of the present invention are not only effective in inhibiting plateout but also exhibit improved thermal and oxidation stability as well as increased compatibility of the various components. The resultant molded or shaped articles also exhibit improved impact strength.

In general, the molding composition of the present invention comprises:

(A) at least one thermoplastic base resin;

(B) at least one fluorescent pigment;

(C) at least one metal salt or complex selected from the group consisting essentially of metal sulfates, carbonates, silicates, oxides, chromates and mixtures thereof;

(D) at least one polymer or oligomer reagent containing a reactive functionality selected from the group consisting essentially of carboxy and the polyvalent salts thereof, hydroxy, epoxy, amino, or combinations thereof; optionally, (E) mineral oil; and, optionally, (F) fillers and processing aids.

The polymers which are useful as the thermoplastic resin in the molding composition of the present invention include most thermoplastic organic polymers which may be processed at temperatures below the decomposition temperatures of any of the components of the composition. Such polymers include polyamides, polyesters, polyurethanes, polyacrylates, polyacrylonitrile, ABS copolymers, polystyrenes, polycarbonates, polyvinylchloride, and polyolefins, particularly low density, linear low density and high density polyethylene and polypropylene and their copolymers. It is intended that the above listed polymer systems include homopolymers and copolymers. High density polyethylene is preferred for the purposes of the present invention. However, it is pointed out that the particular molded or shaped articles to be prepared as well as the molding or shaping process employed to prepare the particular molded article will be factors in determining the selection of the particular thermoplastic resin to be used in the molding composition of the invention.

Pigments and/or dyes useful in formulating the molding composition of the present invention are preferably fluorescent materials. Such materials include both organic, and inorganic compounds and may be fluorescent dyes, fluorescent pigments and the intermediates of fluorescent dyes and pigments. Such dyes or pigments will generally include the colors of red, orange, yellow, pink, green or blue. Exemplary of such fluorescent material which may be used in the composition according to the present invention are modified polyamides made from a co-condensation product of: (a) a polyfunctional primary amine, preferably a difunctional amine; (b) a monocarboxylic aromatic acid, preferably benzoic acid or a substituted carboxy benzene; (c) a polycarboxylic aromatic acid, preferably a dicarboxylic aromatic acid with carboxy groups on noncontiguous carbon atoms, and optionally (d) an epoxy resin which will not destroy the thermoplastic characteristics of the co-condensation product, preferably one based on bisphenol A, such that at least one carboxy group remains on the majority of the molecules of the co-condensate. More particularly, the material consists of a pigment made from the modified polyamide described above and a coloring material, preferably one which is compatible with the modified polyamide and preferably one which is characterized by an ability to fluoresce in the presence of ultraviolet or blue-green light. Thus, the pigment may be obtained by the preparation of a co-condensate of (a) (b) (c) and (d), which may include a coloring material, and particularly a daylight fluorescent dye. The ratio of a:b:c may vary widely provided at least one carboxy group remains on the majority of the molecules of the condensate, and the average molecular weight is not substantially in excess of 2500. The molar ratio of a:b:c ranges from about 10:1:10 to about 1:1:1; most preferred are ratios of a:b:c from about 4:1:4 to about 1:1:1. Preferred molar ratios of a:b:c:d range from about 3:3:4:1 to about 1:13:17:6.

In another embodiment the pigment material consists of a co-condensation product of: (a) a polyfunctional primary amine, preferably a difunctional amine; (c) a polycarboxylic aromatic acid, preferably a dicarboxylic aromatic acid with a carboxy group on noncontiguous atoms, chosen in such a ratio as to provide at least one carboxy group remaining on the majority of the molecules of the co-condensate. A coloring material of a fluorescent dye may be added to the co-condensate to form a pigment. The ratio of a:c may vary widely provided at least one carboxy group remains on the majority of the molecules of the co-condensate and the average molecular weight is not substantially in excess of 2500. The molar ratio of a:c is always greater than 1:1 but not greater than 1:2.

The above pigments are described in U.S. Pat. No. 3,915,884 which is expressly incorporated herein by reference for such disclosure.

Other suitable pigment materials useful in the molding process of the present invention are thermoplastic resins that may be formed from an aromatic monosulfonamide having two reactive amide hydrogens, a cyclic aminotriazine having at least two primary amino groups and formaldehyde or paraformaldehyde. If desired either or both of the first mentioned components may be separately reacted with formaldehyde to form a thermoplastic sulfonamide-aldehyde resin or a B-stage (partially condensed) aminotriazinealdehyde resin, respectively, before being co-condensed. The aromatic sulfonamide may comprise toluene sulfonamide, e.g., o- or p-toluene sulfonamide or mixtures thereof, benzene sulfonamides, or the alkyl derivatives of such sulfonamides, and the like, in which the sulfonamido group is attached directly to the aromatic nucleus through the sulfur atom. These pigment materials are described in U.S. Pat. Nos. 2,938,873 and 3,303,168 which are expressly incorporated herein by reference for such disclosure.

Suitable polymer or oligomer reagents for the purposes of the present invention are materials which contain a reactive functionality that is reactive with various plateout substances that may be present in the molding composition or that may be produced during the molding or shaping process. Such functionalities include carboxy and the polyvalent metal salts thereof, hydroxy, epoxy, amino and combinations thereof. Materials containing these fucntionalities include such polymers and oligomer materials is ionomer resins, fatty acids, the salts and dimer acids thereof, polyamines, fatty acid epoxides, glycidyl and diglycidyl ethers and the like.

Ionomer copolymers or resins useful in the present invention are copolymers of an α-olefin and an ethylenically unsaturated carboxylic acid. These copolymers are refered to as ionomers because of their ionic character which is obtained by neutralizing with metal ions at least a portion of the free acid groups in the copolymer. These resins are described, for example, in U.S. Pat. No. 3,454,676 which disclosure is expressly incorporated herein by reference for the disclosure of these resins. For the purposes of the present invention, a preferred ionomer resin is of the Surlyn TM type manufactured by DuPont. Useful metal ions, include those having an oxidation state of 1-3 inclusive, and particularly those of Group I (a and b) and Group II (a and b) as well as the transition metals of the Periodic Table. For the purposes of the present invention, zinc is preferred. Examples of olefins which may be used to prepare the ionomer resin of the present invention include ethylene, propylene, butene-1 and hexene-1. Examples of ethylenically unsaturated carboxylic acids useful in preparing the ionomer resins of the present invention include acrylic and methacrylic acids, maleic and fumaric acids and the monoalkyl esters and anhydrides thereof. Copolymers of ethylene and acrylic acid or methacrylic acid are preferred.

Suitable fatty acid reagents include oligomers and dimers of such acids as stearic, oleic, dodecanoic, eicosonic, and the like. The polyvalent metal salts of these carboxylic acids may also be used and in some instances may be preferred, e.g., the zinc salt of stearic acid. Also various polymers and copolymers of maleic acid and maleic anhydride may be used. For example, copolymers of styrene-maleic anhydride, ethylene-maleic anhydride, ethylene, propylene-maleic anhydride, ethylene; vinyl acetate-maleic anhydride and the like may be used.

The polyamides which may be useful in the present invention include various alkylene, aromatic, substituted and unsubstituted polyamines of such amines as benzylamine, hexylamine, propylamine, diethanol amine, triethanol amine, ethylene diamine, diethylenetriamine, hexamethylene diamine and the like. Also polymers and copolymers of heteroatom amines such as oxazolines, and the like may be employed.

Illustrative epoxides, which polymers and oligomers thereof are useful in accordance with the invention include various fatty acid type epoxides as well as glycidyl and diglycidyl ethers. Exemplary of such epoxides are 1-octene oxide, 2-octene oxide, 1-dodecene oxide, 1-hexadecene oxide, 1-eicosens oxide, butyl epoxystearate, commercial mixtures of $C_{12-18}$ straight chain α-olefin epoxides, glycidyl ethers of glycerol, glycidyl ethers of tetrakis (hydroxy phenyl) ethane and the like.

With respect to the metal salts or complexes, as discussed above, the, particular salt or complex must be capable of absorbing, adsorbing and/or reacting with plateout materials present in the molding composition. Such plateout materials that may be present in the molding composition or formed during the molding or shaping operation, include low molecular weight amines, amides, polyamines and polyamides. Metal salts or complexes useful for the molding composition of the present invention include metal sulfates, metal carbonates, metal silicates, metal oxides, metal chromates and mixtures thereof. These materials will be present in the molding composition in an amount sufficient to absorb/adsorb and/or react with plateout materials in the molding composition or formed during the molding or shaping process. The materials may also serve the dual function of providing good mold release property at the conclusion of the molding or shaping operation. Preferred metal salts or complexes include alkaline earth sulfates, carbonates or oxides, iron oxides, sulfates or carbonates, titanium oxides, tin oxides and mixtures thereof. Such salts specifically include $BaSO_4$, $ZnO$, $MgO$, $CaO$, $CaCO_3$ and $CaSO_4$. The most preferred is barium sulfate for the purposes of the present invention.

Mineral oil may be employed in the molding composition of the invention as an encapsulating or wetting agent.

The molding composition of the present invention may also include other art recognized additives for plastic molding compositions which may be used in a variety of molding processes. Such other additives include fillers and processing aids. Specifically, such materials include talc, clay, glass powder, dolomite, diatomaceous earth, titanium dioxide and the like. Furthermore, flame retardant agents, antioxidants, antistatic agents, mold release agents and the like may also be added to the composition.

For the purposes of the present invention, the thermoplastic resins will be present in the molding composition in an amount sufficient to produce a well dispersed encapsulated pigmented pellet form and to give a dimensionally stable molded article having sufficient impact strength. Preferably, this amount will range from about 20% to about 80% by weight in preparing the color concentrate molding composition to be blended with virgin thermoplastic resin. If the particular thermoplastic resin is a high density polyethylene, the preferred amount of the thermoplastic resin in the color concentrate molding composition of the present invention is about 40% by weight. The fluorescent pigment is present in an amount to give the desired opacity, color and fluorescence. For the purposes of the present invention, this amount will preferably be in the range of about 15% to about 45% by weight for the concentrate molding composition. The metal salt or complex, as pointed out above, may be present in an amount sufficient to absorb, adsorb and/or react with plateout materials present in the composition or formed during the molding or shaping operation. In general this amount will range from about 5% to about 20% by weight of the concentrate molding composition and preferably about 10% by weight if the particular metal salt is barium sulfate. The polymer or oligomer reagent will be present in an amount sufficient to inhibit plateout of the pigment. This amount will generally range from about 1% to about 25% by weight and if an ionomer resin is employed, the amount will preferably range from about 5% to about 18%. If mineral oil is present in the composition, it will range from about 0% to about 3% by weight and is most preferably present in an amount of about 1% by weight. The remaining fillers and/or processing agents will be present in amount of up to about 25% by weight of the concentrate molding composition and will make up the balance of the composition depending upon the amounts of the other components added to the composition. The above relative amounts given for each of the respective components of the composition have been determined to give a molding composition which is highly effective in preventing plateout of pigment on the mold or shaping surface as well as giving improved thermal and oxidation stability and increased compatibility of the particular components making up the composition. It should be clear to one skilled in the art that specific amounts of each component will vary depending on the specific material used to formulate the molding composition as well as the specific molded or shaped article to be prepared and the particular molding or shaping process to be utilized.

The above described color concentrate molding composition may be formulated in any desired physical form to be blended with unformulated thermoplastic resins and processed into a molded or shaped article. It will be recognized by one skilled in the art, however, that for most molding and/or shaping processes, pellets of the concentrate are most advantageous for accommodating most molding and shaping apparatuses or processes, e.g., injection molding, extrusion molding or shaping, blow molding and the like. Moreover, the various components of the molding composition of the invention may be compounded directly with the particular thermoplastic resin in the appropriate concentration range for molding. This is opposed to preferably first preparing a concentrate for dilution with virgin thermoplastic resin.

Components of the molding composition may be added in a single batch and blended or alternatively the polymeric reagent containing a reactive functionality and the pigment may be first blended together and subsequently added to the other components to make up the balance of the composition. The thus formed color concentrate molding composition will be blended with virgin thermoplastic resin in an amount sufficient to give the desired strength, opacity, coloration, i.e., pigment loading, and other such properties desired for the article to be formed. Generally, this amount will range in a ratio from about 100 to 1 to about 10 to 1 of virgin resin to the color concentrate according to the invention. This blend ratio results in an approximate pigment concentration in the blend of about 1% to about 10% by weight of the total blend. In a more preferred embodiment of the invention, the blend ratio will vary from about 50 to 1 to about 10 to 1 and in a most preferred embodiment this ratio will vary from about 35 to 1 to about 20 to 1 of the virgin resin to the color concentrate. This blend composition may then be utilized to prepare a variety of different molded or shaped articles by various molding and shaping processes. For example, such molded articles as fibers and films may be prepared from this molding composition as well as specific articles such as bottles, closures, transition parts of bottles, toys, furniture and cabinets for various electronic equipment and the like. These molded articles may be prepared by such processes as injection molding, injection blow molding, sheet extrusion, film extrusion, blow molding, thermoforming and the like. For example, closures, toys and furniture may be prepared by injection molding. Bottles are prepared by injection blown molding techniques and plastic bags are prepared from blow film.

Various molding compositions representative of compositions within the scope of the present invention are illustrated in the following examples. While these examples will show one skilled in the art how to operate within the scope of this invention, they are not to serve as a limitation on the scope of the invention for such scope is defined only in the claims. It is pointed out that in the following examples, and elsewhere in the present specification and claims, all percentages and all parts are intended to express percent by weight and parts by weight unless otherwise clearly indicated.

EXAMPLE I

A color concentrate molding composition according to the present invention was formulated as follows:
   5% - $TiO_2$
   19% - strong fluorescent yellow pigment from Day-Glo Color Corp.
   14% - strong fluorescent orange pigment from Day-Glo Color Corp.
   46% - high density polyethylene (HDPE)
   11% - $BaSO_4$
   5% - Zinc based SURLYN TM The above color concentrate composition was pelletized and blended with virgin high density polyethylene (HDPE) in a ratio of 25 to 1 (HDPE to the concentrate).

EXAMPLE II

A color concentrate molding composition according to the present invention was formulated as follows:
   25% - strong fluorescent yellow pigment from Day-Glo Color Corp.
   5% - $TiO_2$
   5% - Zn based SURLYN TM
   10% - $BaSO_4$
   1% - Calcium Stearate
   53% - HDPE
   1% - mineral oil The above color concentrate composition was pelletized and blended with virgin high density polyethylene (HDPE) in a ratio of 25 to 1 (HDPE to the concentrate).

EXAMPLE III

A color concentrate molding composition according to the present invention was formulated as follows:
   28% - strong fluorescent orange pigment from Day-Glo Color Corp.
   11% - strong fluorescent orange pigment from Day-Glo Color Corp.
   4% - $TiO_2$
   10% - $BaSO_4$ 5% - Zn Based SURLYN ™
42% - HDPE The above color concentrate composition was pelletized and blended with virgin high density polyethylene (HDPE) in a ratio of 33 to 1 (HDPE to the concentrate).

EXAMPLE IV

A color concentrate molding composition according to the present invention was formulated as follows:
11% - $TiO_2$
14% - strong fluorescent orange pigment from Day-Glo Color Corp.
7.5% - strong fluorescent orange pigment from Day-Glo Color Corp.
9% - $BaSO_4$
53% - HDPE
4.5% - Zn Based SURYLN ™

The above color concentrate composition was pelletized and blended with virgin high density polyethylene (HDPE) in a ratio of 33 to 1 (HDPE to the concentrate).

EXAMPLE V

A color concentrate molding composition according to the present invention was formulated as follows:
33% - strong fluorescent orange pigment from Day-Glo Color Corp.
4% - Cadmium pure light red pigment from Ferro Corp.
4% - Cadmium red pigment from Ferro Corp.
5% - $TiO_2$
10% - $BaSO_4$
5% - Zn Based SURYLN ™
1% - mineral oil
38% - HDPE The above color concentrate composition was pelletized and blended with virgin high density polyethylene (HDPE) in a ratio of 20 to 1 (HDPE to the concentrate).

Plastic plaques were prepared by injection molding techniques from the molding composition blends of Examples I-V described above. The molds were then examined for plateout by the following procedure.

All the Example compositions contained 3000 gms. of blow mold grade HDPE. The plaques were prepared at an injection blow molded at a temperature of 410°-425° with a 30 sec. cycle.

The mixture of HDPE and concentrate is run on the injection molding machine for one hour.

Both sides of the mold are visually examined for any build-up, color build-up, non-colored build-up, waxy or crystalline characteristics, odor and the like.

A white cotton cloth or tissue paper is soaked in rubbing alcohol, and a straight line smear is made on the mold cavity and on the flat back of the mold.

The level of plateout is then subjectively evaluated using a 1 to 10 scale:
0—No plateout on the mold, and no color or chemical residue on smeared cloth.
10—Infinite plateout on the mold, and color or chemical residue on smeared cloth.

If the plateout is between the scale of 0-3, the product will pass as a non-plateout color concentrate.

All the above molding compositions of Examples I-V passed this procedure for non-plateout.

While the invention has been described and illustrated above with reference to a specific preferred embodiment thereof, those skilled in the art will appreciate the various changes, modifications and substitutions made therein without departure from the spirit of the invention. For example, various amounts for each of the components and specific materials used for each of the components of the molding composition other than the preferred amounts or materials set forth hereinabove may be applicable as a consequence of the nature of the various components employed in the process and such other expected variations or differences and results are contemplated in accordance with the practices of the present invention. It is intended, therefore, that the invention be limited only by the scope of the claims which follow.

We claim:

1. A non-plateout, pigmented molding composition having improved thermal and oxidation stability and increased compatibility of the components comprising:
   (A) at least one moldable thermoplastic resin selected from the group consisting of ethylene polymers and copolymers, propylene polymers and copolymers, acrylonitrile polymers and copolymers, polymers and copolymers of acrylic acid, methacrylic acid and their esters;
   (B) at least one fluorescent pigment; and an effective amount of plateout inhibiting agents comprising:
   (C) at least one metal salt or complex selected from the group consisting of metal sulfates, carbonates, silicates, oxides, chromates and mixtures thereof; and
   (D) at least about 5% by weight of at least one polymer or oligomer reagent containing a reactive functionality reactive with plateout substances present or produced during the molding process and selected from the group consisting essentially of carboxy and the polyvalent salts thereof, hydroxy, epoxy, amino and combinations thereof.

2. The molding composition according to claim 1 wherein said thermoplastic resin is high density polyethylene.

3. The molding composition according to claim 1 wherein said pigment comprises a polyamide resin.

4. The molding composition according to claim 3 wherein said fluorescent pigment is a particulate dyed thermoplastic friable substantially linear modified polyamide having at least one free carboxy group and formed by reacting in the liquid state,
   a. a polyfunctional amine selected from the group consisting of 1-amino-3-aminomethyl-3,5,5-trimethyl cyclohexane, meta-xylylene diamine, para-xylylene diamine, ethylene diamine, diethylene triamine, triethylene tetramine, dimethylamino propylamine, diethylamino propylamine, trimethyl-hexamethylene diamine, and 1,3-di-4-piperidyl-propane,
   b. a monocarboxylic compound selected from
      1. an aromatic monocarboxylic acid selected from benzoic acid, p-toluic acid, o-toluic acid and 4-methoxy benzoic acid,
      2. the monocarboxy-condensation product of (I) an alkyl primary monoamine selected from cycloalkyl primary monoamines, heterocyclic secondary monoamines, and benzylamine with an equimolar amount of (II) a dicarboxylic acid selected from isophthalic acid, terephthalic acid, dicarboxy naphthalene,and aliphatic dicarboxylic acids having less than 10 carbon atoms serially linked in a chain; and c. a polycarboxylic acid selected from isophthalic acid, terephthalic acid, trimesic acid, dicarboxy naphthalene, tricarboxy napthalene, pyromellitic acid and aliphatic dicarboxylic acids having less than 10 carbon atoms serially linked in a chain in a molar ratio of a:b:c ranging from 10:1:10 to 1:1:1, said polyamide having a molecular weight in the range of from about 400 to 2500, said polyamide also containing a coloring dye.

5. The molding composition according to claim 4 wherein said coloring material is at least one daylight dye in an amount effective for daylight fluorescence.

6. The molding composition according to claim 1 wherein said metal salt or complex is selected from the group consisting of alkaline earth sulfates, carbonates, or oxides, iron oxides, sulfates or carbonates, titanium oxides, tin oxides and mixtures thereof.

7. The molding composition according to claim 6 wherein said metal salt or complex is selected from the group consisting of $BaSO_4$, ZnO, MgO, CaO, $CaCO_3$, $CaSO_4$ or mixtures thereof.

8. The molding composition according to claim 7 wherein said metal salt or complex is $BaSO_4$.

9. The molding composition according to claim 1 wherein said polymer or oligomer reagent is selected from the group consisting of ionomer resins, oligomer and dimer fatty acids, and the salts thereof, polyamines and the polymers and copolymers of fatty acid epoxides, glycidyl and diglycidyl ethers.

10. The molding composition according to claim 9 wherein said polymer or oligomer reagent is selected from the group consisting of the zinc salt dimer of stearic acid, polymeric epoxide of a commercial mixture of $C_{12}$ to $C_{18}$ straight chain α-olefins, diethylene triamine, pentamethylene tetramine, an ionomer resin and mixtures thereof.

11. The molding composition according to claim 10 wherein said polymer or oligomer reagent is a zinc based ionomer resin.

12. The molding composition according to claim 1 wherein said composition further comprises mineral oil.

13. The molding composition according to claim 1 wherein said composition further comprises a filler.

14. The molding composition according to claim 1 wherein said composition further comprises a processing aid.

15. The molding composition according to claim 1 in the form of a color concentrate wherein:
(A) is present in an amount ranging from about 20% to about 80% by weight;
(B) is present in an amount ranging from about 15% by weight to about 45% by weight;
(C) is present in an amount ranging from about 0% to 20% by weight; and
(D) is present in an amount ranging from about 1% to about 25% by weight.

16. The molding composition according to claim 1 wherein:
(A) is high density polyethylene;
(B) is a fluorescent orange pigment;
(C) is $BaSO_4$; and
(D) is a zinc based ionomer resin.

17. A non plateout pigmented molding composition in color concentrate form having improved thermal and oxidation stability and improved compatibility of its components comprising:

(A) about 40% by weight of high density polyethylene;
(B) about 15% to about 30% by weight of fluorescent orange pigment;
(C) about 10% by weight of $BaSO_4$;
(D) about 10% by weight of a zinc based ionomer resin;
(E) about 1% by weight of mineral oil; and,
(F) the balance of fillers and processing aids.

18. A non-plateout, pigmented molding composition having improved thermal and oxidation stability and increased compatibility of its components comprising:
(A) at least one moldable thermoplastic resin selected from the group consisting of ethylene polymers and copolymers, propylene polymers and copolymers, acrylonitrile polymers and copolymers, polymers and copolymers of acrylic acid, methacrylic acid and their esters;
(B) at least one fluorescent pigment; and, an effective amount of the following plateout inhibiting agent comprising:
(C) at least about 5% by weight of at least one polymer or oligomer reagent containing a reactive functionality reactive with plateout substances present or produced during the molding process and selected from the group consisting essentially of carboxy and the polyvalent salts thereof, hydroxy, epoxy, amino and combinations thereof.

19. The molding composition according to claim 18 wherein said thermoplastic resin is high density polyethylene.

20. The molding composition according to claim 18 wherein said pigment comprises a polyamide resin.

21. The molding composition according to claim 19 wherein said fluorescent pigment is a particulate dyed thermoplastic friable substantially linear modified polyamide having at least one free carboxy group and formed by reacting in the liquid state, a. a polyfunctional amine selected from the group consisting of 1-amino-3-aminomethyl-3,5,5-trimethyl cyclohexane, meta-xylylene diamine, para-xylylene diamine, ethylene diamine, diethylene triamine, triethylene tetramine, dimethylamino propylamine, diethylamino propylamine, trimethyl-hexamethylene diamine, and 1,3-di-4-piperidyl-propane, b. a monocarboxylic compound selected from
1. an aromatic monocarboxylic acid selected from benzoic acid, p-toluic acid, o-toluic acid and 4-methoxy benzoic acid,
2. the monocarboxy-containing condensation product of (I) an alkyl primary monoamine selected from cycloalkyl primary monoamines, heterocyclic secondary monoamines, and benzylamine with an equimolar amount of (II) a dicarboxylic acid selected from isophthalic acid, terephthalic acid, dicarboxy naphthalene, and aliphatic dicarboxylic acids having less than 10 carbon atoms serially linked in a chain; and c. a polycarboxylic acid selected from isophthalic acid, terephthalic acid, trimesic acid, dicarboxy naphthalene, tricarboxy naphthalene, pyromellitic acid and aliphatic dicarboxylic acids having less than 10 carbon atoms serially linked in a chain in a molar ratio of a:b:c ranging from 10:1:10 to 1:1:1, said polyamide having a molecular weight in the range of from about 400 to 2500, said polyamide also containing a coloring dye.

22. The molding composition according to claim 21 wherein said coloring material is at least one daylight dye in an amount effective for daylight fluorescence.

23. The molding composition according to claim 18 wherein said polymer or oligomer reagent is selected from the group consisting of ionomer resins, the dimers and salts of fatty acids, polyamines and the polymers and copolymers of fatty acid epoxides, glycidyl and diglycidyl ethers.

24. The molding composition according to claim 23 wherein said polymer or oligomer reagent is selected from the group consisting of the zinc salt of stearic acid, polymeric epoxides of a commercial mixture of $C_{12}$ to $C_{18}$ straight chain α-olefin, diethylene triamine, pentamethylene tetramine, an ionomer resin and mixtures thereof.

25. The molding composition according to claim 24 wherein said polymer or oligomer reagent is a zinc based ionomer resin.

26. The molding composition according to claim 18 wherein said composition further comprises mineral oil.

27. The molding composition according to claim 18 wherein said composition further comprises a filler, a processing aid or mixtures thereof.

* * * * *